United States Patent
Arvind et al.

(10) Patent No.: US 9,502,898 B2
(45) Date of Patent: Nov. 22, 2016

(54) SYSTEMS AND METHODS FOR MANAGING A POWER DISTRIBUTION SYSTEM

(75) Inventors: Kamal Kumar Arvind, Atlanta, GA (US); Vernon Meadows, Lilburn, GA (US); Marc Karl Losee, Woodstock, GA (US)

(73) Assignee: General Electric Company, Schenectady, NY (US)

( * ) Notice: Subject to any disclaimer, the term of this patent is extended or adjusted under 35 U.S.C. 154(b) by 693 days.

(21) Appl. No.: 13/363,810

(22) Filed: Feb. 1, 2012

(65) Prior Publication Data

US 2013/0197702 A1    Aug. 1, 2013

(51) Int. Cl.
*G06F 1/26* (2006.01)
*H02J 3/00* (2006.01)

(52) U.S. Cl.
CPC ............ *H02J 3/006* (2013.01); *H02J 3/005* (2013.01); *H02J 2003/001* (2013.01)

(58) Field of Classification Search
CPC ............. H02J 3/00; H02J 3/14; H02J 9/04; H02J 3/006; H02J 3/005; H02J 2003/001; G06Q 50/06; G06F 1/3203; Y04S 20/222
USPC .......................................... 700/22, 286, 295
See application file for complete search history.

(56) References Cited

U.S. PATENT DOCUMENTS

| | | | |
|---|---|---|---|
| 6,583,521 B1 | 6/2003 | Lagod et al. | |
| 6,657,416 B2 * | 12/2003 | Kern | H02J 9/066 290/40 A |
| 7,010,437 B2 * | 3/2006 | Lubkeman et al. | 700/286 |
| 7,184,903 B1 * | 2/2007 | Williams | H02J 3/32 702/60 |
| 7,304,403 B2 | 12/2007 | Xu | |
| 7,412,304 B2 * | 8/2008 | Uenou | G06Q 50/06 307/29 |
| 7,834,479 B2 | 11/2010 | Capp et al. | |
| 8,121,743 B2 * | 2/2012 | Boss et al. | 700/295 |
| 8,200,370 B2 * | 6/2012 | Paik | 700/291 |
| 8,359,124 B2 * | 1/2013 | Zhou et al. | 700/291 |
| 8,407,017 B2 * | 3/2013 | Hancock | G01R 31/42 702/62 |
| 8,412,654 B2 * | 4/2013 | Montalvo | 706/15 |
| 8,521,336 B2 * | 8/2013 | Paik | 700/291 |
| 8,527,107 B2 * | 9/2013 | Forbes et al. | 700/295 |
| 8,543,251 B2 * | 9/2013 | Plant | 700/298 |
| 8,600,573 B2 * | 12/2013 | Black et al. | 700/291 |
| 8,803,362 B2 * | 8/2014 | Schmiegel | 307/85 |
| 2002/0024332 A1 | 2/2002 | Gardner | |
| 2002/0190526 A1 * | 12/2002 | Kern | H02J 9/066 290/40 B |
| 2002/0190527 A1 * | 12/2002 | Kern | H02J 9/066 290/40 B |
| 2002/0190576 A1 * | 12/2002 | Kern | H02J 3/38 307/18 |

(Continued)

OTHER PUBLICATIONS

U.S. Appl. No. 13/363,847, filed Feb. 1, 2012, Marc Karl Losee.

(Continued)

*Primary Examiner* — Charles Kasenge
(74) *Attorney, Agent, or Firm* — Parks IP Law LLC; Stephen J. Terrell

(57) ABSTRACT

A system and method of determining priorities for restoration of power in a power distribution system includes collecting customer prioritization data for a set of customers. An inconvenience factor is determined from the customer prioritization data for each customer. A zone restoration factor is then determined from the inconvenience factor for each customer. The inconvenience factor takes into account the estimated outage time, the customer's back-up time, the willingness of the customer to use back-up devices, and customer's priority for the estimated outage time.

36 Claims, 4 Drawing Sheets

(56) References Cited

U.S. PATENT DOCUMENTS

| | | | |
|---|---|---|---|
| 2005/0096856 A1* | 5/2005 | Lubkeman et al. | 702/58 |
| 2007/0216515 A1* | 9/2007 | Uenou | G06Q 50/06 340/3.42 |
| 2008/0231114 A1 | 9/2008 | Tolnar et al. | |
| 2009/0112375 A1* | 4/2009 | Popescu | 700/292 |
| 2010/0088261 A1* | 4/2010 | Montalvo | 706/15 |
| 2010/0141046 A1* | 6/2010 | Paik | 307/126 |
| 2010/0145534 A1 | 6/2010 | Forbes et al. | |
| 2010/0145884 A1* | 6/2010 | Paik | 705/412 |
| 2010/0179670 A1 | 7/2010 | Forbes et al. | |
| 2010/0256846 A1 | 10/2010 | Shaffer | |
| 2011/0010018 A1 | 1/2011 | Haugh | |
| 2011/0022239 A1* | 1/2011 | Forbes et al. | 700/286 |
| 2011/0066300 A1* | 3/2011 | Tyagi et al. | 700/291 |
| 2011/0125335 A1* | 5/2011 | Boss et al. | 700/286 |
| 2011/0231028 A1* | 9/2011 | Ozog | 700/291 |
| 2011/0231320 A1* | 9/2011 | Irving | 705/80 |
| 2012/0065805 A1* | 3/2012 | Montalvo | 700/297 |
| 2012/0130556 A1* | 5/2012 | Marhoefer | H02J 3/32 700/291 |
| 2012/0158198 A1* | 6/2012 | Black et al. | 700/291 |
| 2012/0158199 A1* | 6/2012 | Plant | 700/292 |
| 2012/0232712 A1* | 9/2012 | Paik | 700/295 |
| 2013/0054216 A1* | 2/2013 | San Andres | 703/13 |
| 2013/0197706 A1* | 8/2013 | Losee et al. | 700/295 |

OTHER PUBLICATIONS

"Electric Power Distribution Systems Operations," NAVFA MO-201, Apr. 1990, 231 pages, Naval Facilities Engineering Command.

\* cited by examiner

SYSTEMS AND METHODS FOR MANAGING A POWER DISTRIBUTION SYSTEM

CROSS-REFERENCE TO RELATED APPLICATIONS

This application is a continuation of U.S. application Ser. No. 13/363,847, entitled "SYSTEMS AND METHODS FOR DYNAMIC ISLANDING TO MINIMIZE LOAD SHED DURING RESTORATION AFTER A FAULT", filed on Feb. 1, 2012.

TECHNICAL FIELD

The subject matter disclosed herein relates generally to power systems and more specifically to systems and methods for managing a power distribution network.

BACKGROUND

Electrical power is typically produced at a plurality of generating stations and distributed through a plurality of networks (transmission grid). Power produced at a generating station is typically three-phase alternating current (AC) power. Power from generating stations is conducted to transmission substation where it is converted to high voltages to facilitate long-distance transport on the transmission grid. Power added to the grid must be synchronized with the existing phase of the particular transmission line being utilized to conduct the power. When the power reaches a regional distribution area, the high transmission voltage is typically stepped down at a power substation to accommodate the regional distribution grid. A primary or main distribution power line (feeder line) distributes power from a substation to the surrounding area. Feeder lines may be classified as tie feeders (connects two sources), loop feeders (end connected to a source), radial feeders (connects between a source and a load point), and parallel feeders (connect the source and a load or load center and provide the capability of supplying power to the load through one or any number of the parallel feeders).

Occasionally delivery of power to a group of consumers may be suspended. This may occur when consumer demand for power exceeds production capability causing the network operator to apportion power service to certain customers. This is called load shedding. Load shedding is implemented to avoid automatic shutdown of power stations. To keep the power stations running under such conditions, load shedding may be applied to different parts of the distribution network at set times. For example, critical customers such as hospitals, major factories and, typically, government offices—may get continuous power while parts of the network supplying homes and small business offices may only get power for predetermined time intervals.

Load shedding may also occur during restoration after a fault if there is not enough available power for the demand. When a power outage occurs, fault detection, isolation and recovery (FDIR) programs kick in to isolate the fault and then to restore sections of the distribution network through alternate sources. FDIR systems may be incorporated in utility network management system and may include systems that manage identification and restoration of some or substantially all outage events in a utility grid. In the course of the restoration phase, the FDIR programs may have to shed loads by cutting off power to segments of the distribution network, to restore power into de-energized zones. The shedding of the loads is decided on the last/forecasted loads on the feeders (de-energized zone, alternate sources).

There may be other causes of power outages in a network or sections of a network including, a fault at the power station, damage to the transmission line, damage to substations, short circuits or overloading of electricity mains. If a primary feeder fails, or a fault occurs on a primary feeder or distribution transformer, the other transformers start to feed back through the network protector on the faulted circuit. This reverse power causes the network protector to open and disconnect the faulty supply circuit.

The effect of a power failure is particularly severe in situations where there is an impact on public health and safety or an impact to the environment. For example, hospitals, key communication facilities including emergency broadcast; essential government services such as fire, police, and military; fresh water treatment and waste water treatment facilities; schools designated as emergency shelters; banks; large business media; and individual customers with medical needs would be severely affected during a power outage. Many of these types of customers have back-up power sources.

Operators of power distribution systems, such as for example utilities, closely monitor the reliability and availability of their distribution system. They are normally required by the Public Power distribution network operator Commission (PUC) to record all outages and show progress in improving the extent and frequency of outages. During their rate adjustment period, utilities can are often assessed penalties based on their reliability performance. The power distribution industry has developed performance metrics to measure the reliability and availability of their distribution system. These include the System Average Interruption Frequency Index (SAIFI), System Average Interruption Duration Index (SAIDI), and Customer Average Interruption Duration Index (CAIDI). SAIFI is the average number of interruptions that a customer would experience. SAIDI is the average outage duration for each customer served. CAIDI gives the average outage duration that any given customer would experience. CAIDI can also be viewed as the average restoration time. Operators of power distribution networks are closely monitored by Public Power distribution network operator Commissions (PUC) and may be required to record all outages and show progress in improving the extent and frequency of outages.

BRIEF DESCRIPTION OF THE INVENTION

In accordance with one exemplary non-limiting embodiment, the invention relates to a method of determining priorities for restoration of power in a power distribution system. The method includes collecting customer prioritization data for a set of customers and determining an inconvenience factor from the customer prioritization data on each customer in the set of customers. A zone restoration factor is then determined from the inconvenience factor for each customer. The embodiment may also include a database relating to back-up devices available to customers, and customers willingness to use the back-up devices. The inconvenience factor may be calculated from information such as an estimated outage time, customer's back-up time, willingness of customer to use back-up devices, and customer's priority for the estimated outage time. The inconvenience factor may be calculated by dividing the customer effective interruption time by a customer priority for the estimated outage time.

In another embodiment, there is a system for determining priorities for restoration of power in a power distribution system. The system includes a computer and a subsystem that collects customer prioritization data for a set of customers. The system further includes a subsystem that determines an inconvenience factor from the customer prioritization data on each customer in the set of customers, and a subsystem that determines a zone restoration factor from the inconvenience factor for each customer.

In another embodiment, a method of restoring power in a power distribution system includes collecting customer prioritization data for a set of customers, and determining an inconvenience factor from the customer prioritization data on each customer in the set of customers. A zone restoration factor is determined from the inconvenience factor for each customer; and power is restored in a sequence based on the zone restoration factor.

In another embodiment, there is a system for restoring power in a power distribution system. The system includes a computer and at least one subsystem that collects customer prioritization data for a set of customers. At least one subsystem determines an inconvenience factor from the customer prioritization data on each customer in the set of customers, and at least one subsystem determines a zone restoration factor from the inconvenience factor for each customer. The system also includes at least one subsystem that restores power in a sequence based on the zone restoration factor.

In another embodiment, non-transitory computer readable media for instructing the determination of priorities for the restoration of power in a power distribution system provides instructions to collect customer prioritization data for a set of customers. Instructions are provided to determine an inconvenience factor from the customer prioritization data on each customer in the set of customers and determine a zone restoration factor from the inconvenience factor for each customer.

Other features and advantages of the present invention will be apparent from the following more detailed description of the preferred embodiment, taken in conjunction with the accompanying drawings which illustrate, by way of example, the principles of the invention.

The drawings described herein are for illustration purposes only and are not intended to limit the scope of the present disclosure in any way.

DETAILED DESCRIPTION OF THE INVENTION

In the following description, for purposes of explanation, numerous specific details are set forth in order to provide a thorough understanding of the disclosure. It will be apparent, however, to one skilled in the art that the disclosure can be practiced without these specific details. In other instances, structures and devices are shown only in block diagram form in order to avoid obscuring the disclosure.

Reference in this specification to "one embodiment" or "an embodiment" means that a particular feature, structure, or characteristic described in connection with the embodiment is included in at least one embodiment of the disclosure. The appearance of the phrases "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Embodiments of the present disclosure teach methods and system for managing power distribution system. In one embodiment, the disclosure proposes managing power distribution system in order to minimize inconvenience of customers being served by the power distribution system. In one embodiment, the inconvenience of a customer is calculated based on an ability of the customer to self-sustain using their back-up devices when no power is available through the power distribution system.

Figure 1:
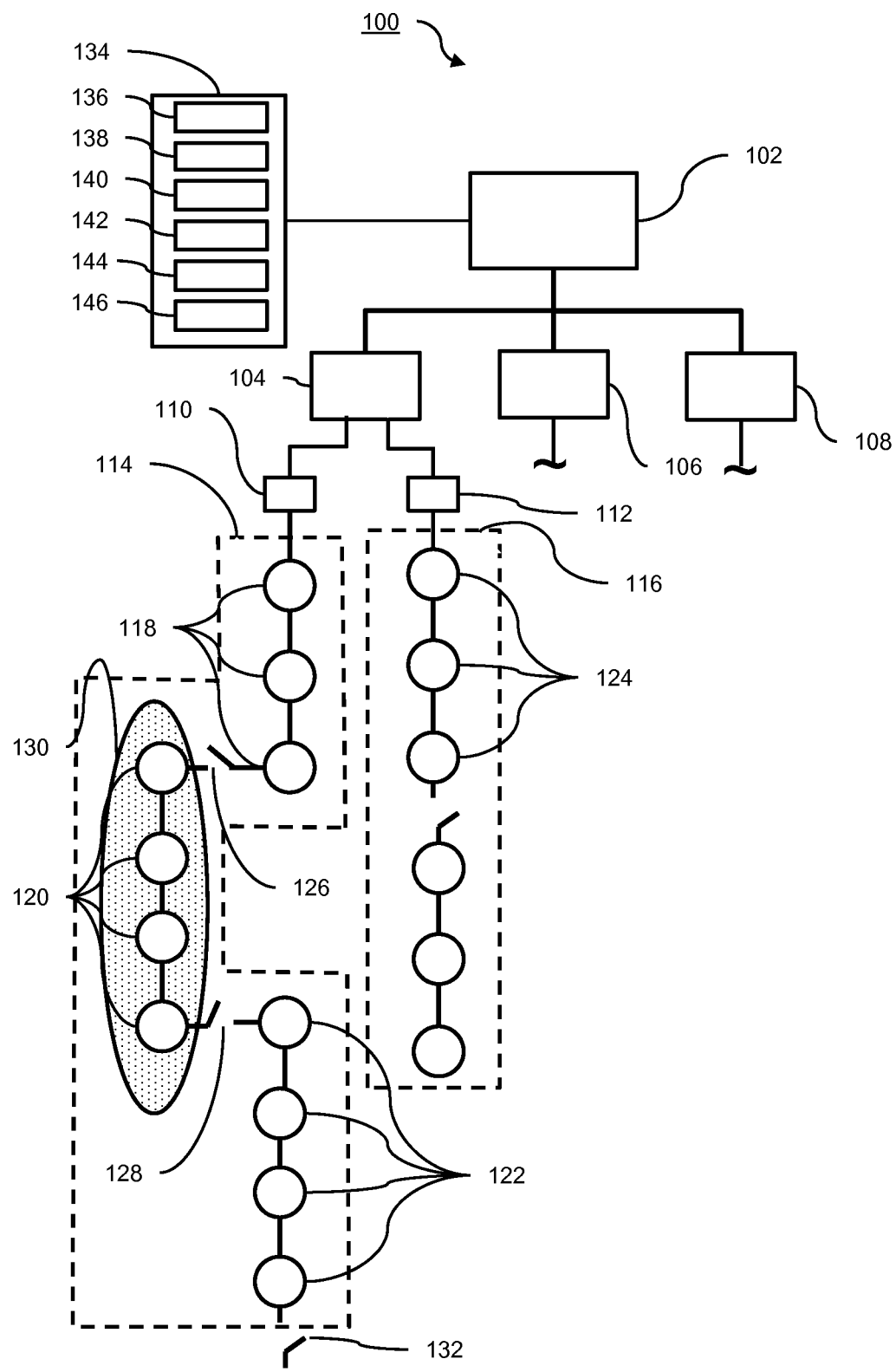
FIG. 1 illustrates a schematic representation of a power distribution system according to an embodiment.

FIG. 1 illustrates a power distribution system 100, in accordance with one embodiment of the disclosure. As illustrated in FIG. 1, the power distribution network 100 may include a transmission system 102, and distribution substations 104, 106 and 108. Although only three distribution substations are illustrated, a typical power distribution network would have a plurality of distribution stations over a wide area. The distribution substations 104, 106 and 108 provide power through transformers through feeder lines in the power distribution network 100. For example distribution substation 104 provides power through transformers 110 and 112 to feeder lines 114 and 116. The feeder lines provide power to sections of individual customers. For example, feeder line 114 supplies power to a first set of customers 118, a second set of customers 120, and a third set of customers 122. Similarly feeder line 116 may provide power to a fourth set of customers 124. In the illustration in FIG. 1 interposed between the first set of customers 118 and the second set of customers 120 is a first switch 126. Similarly interposed between the second set of customers 120 and the third set of customers 122 is a second switch 128. A zone 130 encompassing the second set of customers 120 is highlighted. The third set of customers 122 in the first feeder line 114 may be supplied by an additional feeder line (not shown) which is coupled to the first feeder line 114 through a third switch 132. A network information and control system 134 may be provided to enable network operators to effectively control aspects of the power distribution network 100. The information and control system 134 may be located at each of the distribution substations or single information and control system may be used to control more than one distribution substations. As an example, the network information and a SCADA system 136, a Distribution Management system 138, an Outage Management System, and a Fault Detection Isolation and Restoration (FDIR) system 140. In one embodiment of the invention, the information and control system 134 may include a dynamic restoration priority determination system 144. In another embodiment the information and control system 134 may include a dynamic islanding system 146.

According to an example embodiment, the present disclosure proposes managing the power distribution system based on inconvenience factor of customers in the power distribution system. As an example an inconvenience factor of a customer may be determined based on an estimated outage time and back-up available with the customer. Furthermore each of the customers in the power distribution system may be assigned a priority. The priority may be assigned by an administrator of the power distribution system. As another example, an inconvenience factor of a customer may be measured in terms of outage time, priority of the loads for the customer and available back-up. As an example, a customer who was running a critical machine at the time of outage will have a high in-convenience factor. Furthermore the in-convenience factor of the customer will be mitigated if the customer has a back-up supply or an alternative source to supply. According to an embodiment, the inconvenience factor may be calculated as $$IFi = \frac{\text{(estimated total outage time} - \alpha(\text{Backup time}))}{\text{Customer Priority for estimated outage time}} \quad (1)$$

The "customer's priority for estimated outage time" is a parameter determined by the customer or the power distribution network operator based on the load behavior of the customer. The factor $\alpha$ in equation is willingness of a customer to use available back-up devices. The factor $\alpha$ may be determined each customer. The difference of the estimated outage time and $\alpha$ multiplied by the back-up time is referred to as the customer's effective interruption time. As an example, when the predicted outage for a particular customer is 10 hours and customer has a back-up available for 10 hours, the inconvenience factor for the customer will be less than that of a customer who has back-up only for an hour or than that of a customer with no back-up power at all.

According to an example embodiment, a minimum value of the inconvenience factor of a customer may not be less than zero. When the value of equation (1) is less than zero, the inconvenience factor will be assigned a value equal to zero.

The customer opting for the program may create a priority for different times of the day and different days of the year. As an example a school can opt in for low priority during the holiday period or off school hour period. A manufacturing plant may opt in as low priority load when factory is closed/holiday season. As an added advantage, the customers opting in for low priority may be charged a better rate than the normal customers. This will encourage customers to opt in to the program. Moreover the customer may have an option to enter his back-up time if available and wants to opt into. As an example the customer may indicate that he has a back-up time of 4 hours at low load and 1 hour at high load. The customer may also include a factor $\alpha$ to indicate the customer's willingness to use the back-up capacity. The factor $\alpha$ may have a maximum value of 1 and minimum of 0. Alternatively the factor $\alpha$ may be defined in terms of percentage or any other suitable scale. The power distribution network operator may create a database with a list of customers on the feeder and the priority of the customer and their loads.

In an example embodiment, an inconvenience factor for each of the customers may be calculated. Furthermore a feeder inconvenience factor by summing the inconvenience factor of each of the customers located on the feeder. Moreover a zone inconvenience factor may be calculated by aggregating the customer inconvenience factor for the customers located within the zone. Search inconvenience factor will be calculated as follows:

$$IF = \sum_{1}^{n} \beta(IFi) \quad (2)$$

where n is the number of customers in the feeder or zone; and where $\beta$ is priority of a customer. The priority $\beta$ may be assigned by the power distribution network operator based on the importance of the customer for the power distribution network operator. As an example a fire station may have a higher priority than a grocery store. As another example, a hospital may have a higher priority than a barber shop. The IF may be calculated for each feeder. During the load shedding or restoration the inconvenience factor will be taken into account. For example, if the power distribution network operator has to shed load, then an area with lowest inconvenient factor may be shed.

The proposed algorithm may also utilize a self-sustaining factor $\gamma$ for the customers. The self-sustaining factor $\gamma$ represents the ability of the customer to sustain itself when disconnected from the grid. The $\gamma$ for an ith customer may be calculated as:

$$\gamma i = (\text{estimated total outage time} - \alpha(\text{backup time})) \quad (3)$$

In above equation if the value of the $\gamma$ for a customer is negative, it will be assigned a value of zero. If the value of $\gamma$ for a customer is equal to zero, the customer may be marked as a self-sustaining customer.

Figure 2:
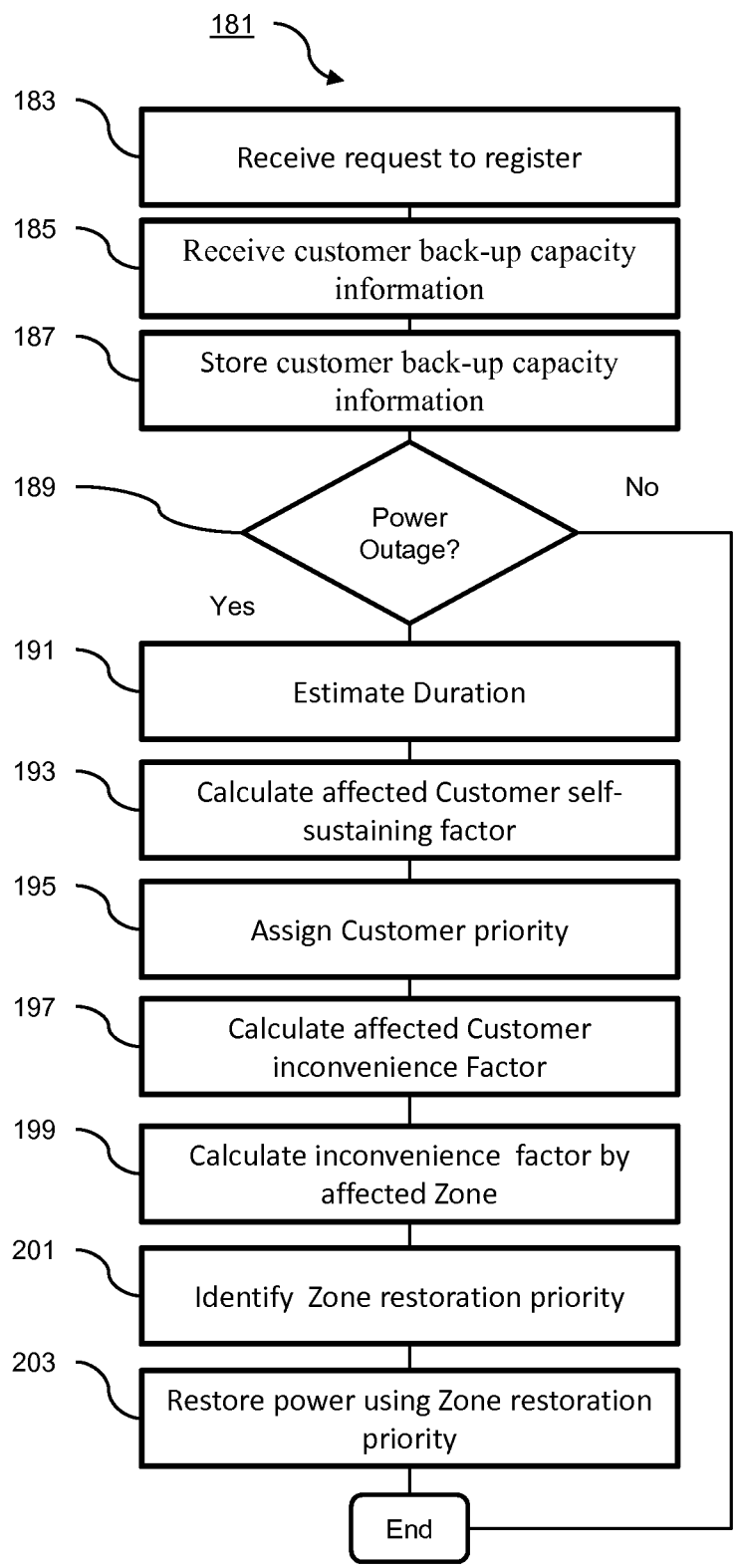
FIG. 2 is a flow diagram of a method for managing a power distribution system.

FIG. 2 is a flow diagram illustrating a method of dynamic restoration priority determination 181 that may be implemented by the dynamic restoration priority determination system 144. The customer may be provided with an option to register and the power distribution network operator may receive a request to register (block 183). The customer may be provided with the ability to register online, or through other conventional means. The power distribution network operator may implement an opt in program for their customers where in cases of load shedding, the power distribution network operator considers the factors that may change a sections priority similar to time of use (TOU) parameters used for meter billings (season, holidays, weekends, time of day). The power distribution network operator may require the customer to provide prioritization data. The prioritization data may include how much back-up the customer has for different priority levels and how willing the customer is to utilize the back-up capacity. The customer opting for the program may be required to create a priority for different times of the day and different days of the year. As an example a school can opt in for low priority during the holiday period or off school hour period. A manufacturing plant may opt in as low priority load when factory is closed/holiday season. As an added advantage, the customers opting in for low priority may be charged a better rate than the normal customers. This will encourage customers to opt in to the program. The power distribution network operator may provide incentives for registration such as preferred pricing similar to pricing structures utilized with demand response management systems (DRMS). Alternately, the power distribution network operator may offer a customer a credit if the customers without power for a period of time. The power distribution network operator may require participating customers to identify their back-up devices, indicate how much time their back-up devices can operate, and indicate their willingness to use their back-up devices. The preceding back-up capacity information is received (block 185) and stored (block 187). The back-up capacity information may be modified when the customer changes any of the inputs.

Upon the occurrence of a power outage (i.e logic element 189) the power distribution network operator may estimate the duration of the outage (block 191). A self-sustaining ($\gamma i$) factor may be calculated for the affected customers (block 193). The power distribution network operator may then assign a priority to the customer or apply a previously determined priority (block 195). The power distribution network operator may then calculate an inconvenience (IFi) for each customer which is sustaining factor multiplied by priority of the customer ($\beta$) [$IFi=\beta\gamma i$] (block 197). For example a hospital may have a higher priority over a barber shop. This priority is taken into account when determining the in-convenience factor. Similarly, if the predicted outage for a particular customer is 10 hours and customer has a back-up available for 10 hours, the inconvenience factor for the customer will be less than that of a customer who has back-up only for an hour or than that of a customer with no back-up power at all. This assigned priority helps to better serve their important customers. This priority is also dynamic and may be changed by the power distribution network operator.

An inconvenience factor by affected zone may then be calculated (block 199). The zone may be a feeder line, an area defined by customers between switches or an area encompassing on or more of the preceding. For example, the power distribution network operator may set the priority of a feeder based on the priority of the customer and the loads priority defined by the customers. The zone inconvenience factor is calculated by summing the inconvenience factor for each customer in the zone. $F=\Sigma_1^n \beta(IFi)$ The power distribution network operator may calculate this inconvenience factor for each zone, such as a feeder or area which is to be restored or where a load shed is required. This is calculated by summing up the IF for all the customers located in the zone. Form the zone inconvenience factor the power distribution network operator may identify or develop a list of zone restoration priorities (i.e. a ranking for each feeder or area based on the in-convenience factor IF) (block 201). This information may then be used by the FDIR to generate restoration plan based on the priority providing a more educated decision on which feeder or area should be restored as first priority. The power distribution network operator may then restore power using the zone restoration priority (block 203).

Figure 3:
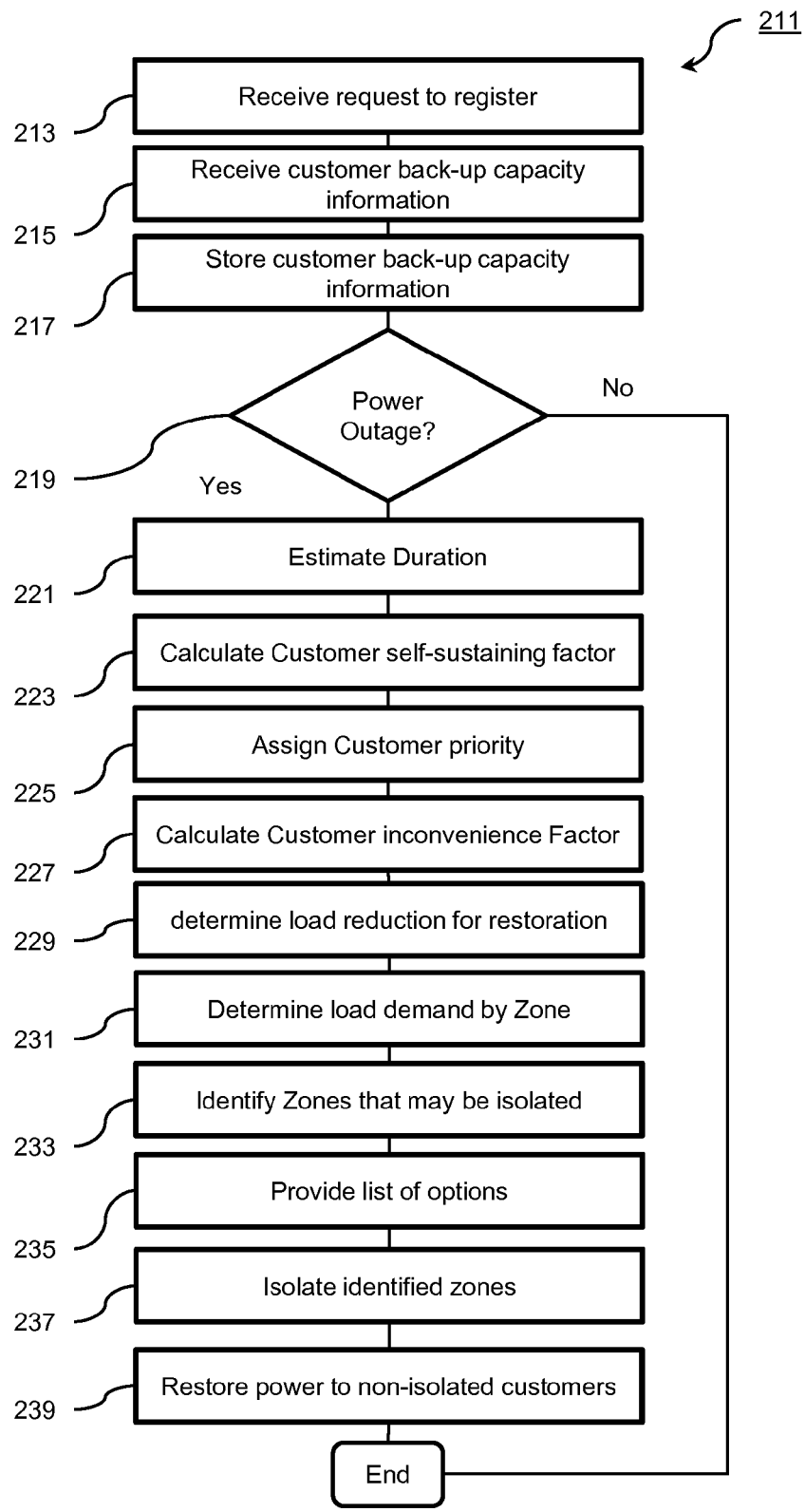
FIG. 3 is another flow diagram of a method for managing a power distribution system.

Illustrated in FIG. 3 is a method of dynamic islanding 211 that may be implemented by the dynamic islanding system 146 to minimize load shed during restoration after a fault. When a power outage occurs, FDIR programs kick in to isolate the fault and then to restore sections of the distribution network through alternate sources. In the course of the restoration phase, the FDIR programs may have to shed loads by cutting off power to segments of the distribution network, to restore power into de-energized zones. Traditionally, the shedding of the loads is decided on the last/forecasted loads on the feeders (de-energized zone, alternate sources). The customer may be provided with an option to register and the power distribution network operator may receive a request to register (block 213). The customer may be provided with the ability to register online, or through other conventional means. The power distribution network operator may require participating customers to identify their back-up devices, indicate how much time their back-up devices can operate, and indicate their willingness to use their back-up devices. The preceding back-up capacity information is received (block 215) and stored (block 217). The back-up capacity information may be modified when the customer changes any of the inputs.

Upon the occurrence of a power outage (i.e logic element 219) the power distribution network operator may estimate the duration of the outage (block 221). A self-sustaining ($\gamma i$) factor may be calculated for customers in the power distribution network or sections of the power distribution network (block 223). The power distribution network operator may then assign a priority to the customers or apply a previously determined priority (block 225). The power distribution network operator may then calculate an inconvenience (IFi) for each customer which is sustaining factor multiplied by priority of the customer ($\beta$) [$IFi=\beta\gamma i$] (block 227). The method implemented by the dynamic islanding system 146 may identify all the customers with value of $\gamma$ equal to zero. Those customers may be disconnected (islanded) from the grid.

The amount of load to be reduced for restoration (or to be reduced on a feeder if it is exceeding load limits). may then be calculated (block 229). The FDIR system 50 will determine how much load needs to be shed in order to restore power on a feeder. The FDIR system 50 may also identify the feeder where the loads need to be reduced. In normal overloading conditions, the DRMS can determine which feeder is exceeding its load limits and load shedding is needed. The dynamic islanding system 146 may determine the load demand by zones (block 231). The zone may be a geographic area, a feeder or an area defined by clusters of customers that are able to be isolated. Based on the load demand by zone and inconvenience factor by zone, the dynamic islanding system 146 may generate a list of zones or customers having the requisite load that may be isolated during restoration with help of the switching elements (block 233). The dynamic islanding system 146 may use geographic information system GIS data to determine location of the identified customers and location of the switches. The identified islanded zones or customers will not be counted in demand prediction for the de-energized zone. A list of options may be provided to the power distribution system operator (block 235) who can then isolate the identified zones (block 237). The power distribution system operator may then restore power the non-isolated customers (block 239).

By utilizing this method the power distribution network operators utilities can minimize the load shedding on the alternate sources or de-energized zone during restoration. A power distribution network operator may concentrate on restoration based on priority according to true need considering the environment they are in. Customers could be incentivized by lower rates for these non-priority hours. Moreover the utilities may factor the back-up supplies/local generation to minimize the load shedding. For example, if there is a university which can sustain itself through back-up for the entire estimated outage period, that university will be islanded from the grid. When calculating the estimated demand for the de-energized zone, the utilities may exclude such islanded customers, thereby reducing the demand, hence reducing the load shedding. The islanding method is dynamic as the customer may change the customer's back-up parameters anytime. For example, some of the customers may not want to use their back-up power and will want to be restored as soon as possible. Those customers who do not want to be islanded may opt out by selecting the value of a in equation as zero.

Figure 4:
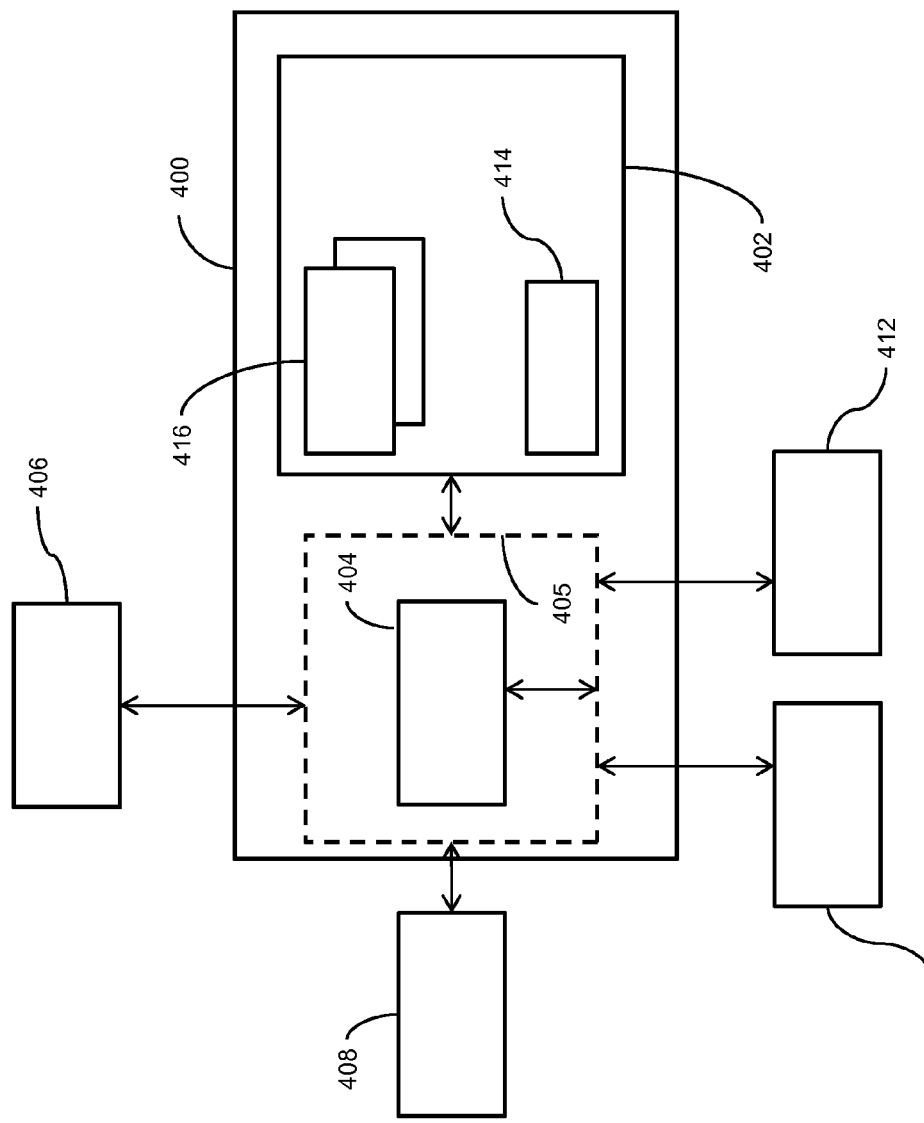
FIG. 4 is a block diagram of one exemplary computer system implementing a method for managing a power distribution system.

An exemplary architecture for a network information and control system 134 is illustrated in FIG. 4. The network information and control system 134 may include a computer system 400 which may be a personal or work station computer, a conventional server computer or a mainframe including single-processor or multiprocessor systems, minicomputers, hand-held computing devices, microprocessor-based or programmable consumer electronics, and the like. The computer system 400 includes a memory component 402 which may include a read only memory (ROM) or a random access memory (RAM). The memory component 402 is connected to a processor 404 through a system bus 405. The processor 404 may be any type of microprocessor or other known processor. Dual microprocessors and other multiprocessor architectures also may also be used as the processor 404. The system bus 405 may be any of several types of bus structures including a memory bus or memory controller, a peripheral bus, and a local bus using any of a variety of conventional bus architectures and may actually comprise multiple bus structures interconnected by various bridges, adapters and/or controllers.

The computer system 400 may be coupled to one or more external components. For example, the computer system 400 may include one or more input devices 406 (for example, a keyboard, a mouse, stylus, a touch-screen, etc), and one or more output devices 408 (e.g. a display comprising one or a combination of a monitor, an alarm, light emitting diodes LED, printers and the like).

The computer system 400 may operate in a networked environment using logical connections to a network 410 such as the Internet, a wide area network (WAN) or a local area network (LAN) through known communication devices such as a modem. The computer system 404 may connect to one or more remote computers, such as a remote client computer connected to the network 410. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet. When used in a LAN networking environment, the computer system is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, may be connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

The computer system 400 also may include one or more mass storage components 412. Mass storage components 412 may include any computer readable media such as a hard disk drive for reading from and writing to a hard disk, a floppy disk drive for reading from or writing to a floppy disk, or an optical disk drive for reading from or writing to an optical disk such as a CD-ROM or other optical media. It should be appreciated by those skilled in the art that other types of media which are readable by a computer, such as magnetic cassettes, flash memory cards, digital video disks, Bernoulli cartridges, and the like, may also be used in the exemplary operating environment. The mass storage component 412 may be connected to the processor 404 by a hard disk drive interface, a magnetic disk drive interface, or an optical drive interface.

The processor 404 may access an operating system 414 and one or more software application programs 416 stored in memory 402. The operating system 414 is one or more programs that manage the hardware resources of the computer system 400, including the memory 402, the input devices 406, the output devices 408, and the mass storage components among others. The operating system 414 also provides common services for software application programs 416. The software application programs 416 are computer program that use the capacities of the computer system 400 directly for a dedicated task. Software application programs 416 are able to manipulate text, numbers and graphics, such as for example, word processing applications, spreadsheet applications, database applications, process control applications, enterprise management applications and the like. The software application programs 416 may include computer programs that implement the method of dynamic restoration priority determination 181 and the method of dynamic islanding 211.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

The preceding general description of a suitable computing environment is provided in order to provide a context for the various aspects of the present invention. While the invention has been described above in the general context of computer executable instructions of a computer program that runs on a computer, those skilled in the art will recognize that the invention also may be implemented in combination with other program modules.

Generally, software include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process. The methods may be implemented in an operating system environment or as standalone routines occupying all, or a substantial part, of the system processing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A power distribution system, comprising:
   a processor;
   a memory comprising computer-executable instructions that, when executed by the processor, cause the processor to:
   determine an outage time;
   determine a plurality of effective interruption times associated with a set of customers, wherein each of the plurality of effective interruption times is based on:
     the outage time; and
     a back-up time associated with a respective one of the set of customers, wherein the back-up time is based on a time for which a back-up device of the respective one of the set of customers can operate;
   determine an inconvenience factor associated with each of the set of customers, wherein each of the inconvenience factors is based on:
     one of the plurality of effective interruption times associated with one of the set of customers; and
     one of a plurality of priority factors associated with the one of the set of customers, wherein each of the plurality of priority factors is associated with a respective one of the set of customers and indicates a priority for restoring power to the one of the set of customers; and
   determine a subset of the set of customers to isolate in order to restore power to the set of customers, wherein the subset of the set of customers is determined based on the inconvenience factors.

2. The power distribution system of claim 1, wherein each of the inconvenience factors is determined based on scaling the one of the effective interruption times with the one of the plurality of priority factors.

3. The power distribution system of claim 1, the memory comprising computer-executable instructions that, when executed by the processor, cause the processor to: determine an amount of a load to be reduced for restoration and determine a load demand associated with each of the set of customers.

4. The power distribution system of claim 3, wherein the subset of the set of customers to isolate is determined based on the load to be reduced for restoration and the load demand associated with each of the set of customers.

5. The power distribution system of claim 1, wherein each of the effective interruption times is further based on a willingness factor, wherein each willingness factor represents how willing a respective one of the set of customers is to use a back-up device.

6. The power distribution system of claim 5, wherein each of the willingness factors scales the back-up time associated with a respective one of the set of customers.

7. The power distribution system of claim 1, wherein each of the plurality of effective interruption times is based on a difference between:
   the outage time; and
   the back-up time associated with a respective one of the set of customers.

8. The power distribution system of claim 1, the memory comprising computer-executable instructions that, when executed by the processor, cause the processor to:
   determine zone factors associated with a plurality of zones, wherein a subset of the set of customers is associated with a respective one of the plurality of zones, wherein each of the zone factors is based on the inconvenience factors associated with a respective subset of the set of customers; and
   determine a subset of the plurality of zones to isolate in order to restore power to the zones, wherein the subset of the plurality of zones is determined based on the zone factors.

9. The power distribution system of claim 8, wherein each of the zone factors is a sum of inconvenience factors associated with the subset of the set of customers associated with the respective one of the plurality of zones.

10. The power distribution system of claim 9, wherein each of the inconvenience factors is determined based on scaling the one of the plurality of effective interruption times associated with one of the set of customers with the one of the priority factors associated with the one of the set of customers.

11. The power distribution system of claim 8, the memory comprising computer-executable instructions that, when executed by the processor, cause the processor to: determine an amount of load to be reduced to restore power to the zones and determine a load demand associated with each of the plurality of zones.

12. The power distribution system of claim 11, wherein the subset of the plurality of zones to isolate is determined based on the amount of load to be reduced to restore power to the zones and the load demand associated with each of the plurality of zones.

13. The power distribution system of claim 8, wherein each of the plurality of effective interruption times is further based on a willingness factor, wherein each willingness factor represents how willing a respective one of the set of customers is to use a back-up device.

14. The power distribution system of claim 13, wherein each of the willingness factors scales the back-up time associated with a respective one of the set of customers.

15. The power distribution system of claim 8, wherein each of the plurality of effective interruption times is based on a difference between:
   the outage time; and
   the back-up time associated with a respective one of the set of customers.

16. The power distribution system of claim 8, wherein at least one of the plurality of zones is served by a feeder line.

17. The power distribution system of claim 8, wherein at least one of the plurality of zones is defined by a set of customers located between two switches in a network.

18. The power distribution system of claim 1, wherein determining the subset of the set of customers to isolate in order to restore power to the set of customers includes determining a subset of a plurality of zones to isolate in order to restore power to the zones.

19. A non-transitory computer readable medium, comprising instructions that, when executed by a processor, cause the processor to:
   determine an outage time;
   determine a plurality of effective interruption times associated with a set of customers, wherein each of the plurality of effective interruption times is based on:
      the outage time; and
      a back-up time associated with a respective one of the set of customers, wherein the back-up time is a time for which a back-up device of the respective one of the set of customers can operate;
   determine an inconvenience factor associated with each of the set of customers, wherein each of the inconvenience factors is based on:
      one of the plurality of effective interruption times associated with one of the set of customers; and
      one of a plurality of priority factors associated with the one of the set of customers, wherein each of the plurality of priority factors is associated with a respective one of the set of customers and indicates a priority for restoring power to the one of the set of customers; and
   determine a subset of the set of customers to isolate in order to restore power to the set of customers, wherein the subset of the set of customers is determined based on the inconvenience factors.

20. The non-transitory computer readable medium of claim 19, wherein each of the inconvenience factors is determined based on scaling the one of the effective interruption times with the one of the plurality of priority factors.

21. The non-transitory computer readable medium of claim 19, comprising instructions that, when executed by the processor, cause the processor to: determine an amount of a load to be reduced for restoration and determine a load demand associated with each of the set of customers.

22. The non-transitory computer readable medium of claim 21, wherein the subset of the set of customers to isolate is determined based on the load to be reduced for restoration and the load demand associated with each of the set of customers.

23. The non-transitory computer readable medium of claim 19, wherein each of the effective interruption times is further based on a willingness factor, wherein each willingness factor represents how willing a respective one of the set of customers is to use a back-up device.

24. The non-transitory computer readable medium of claim 13, wherein each of the willingness factors scales the back-up time associated with a respective one of the set of customers.

25. The non-transitory computer readable medium of claim 19, wherein each of the plurality of effective interruption times is based on a difference between:
   the outage time; and
   the back-up time associated with a respective one of the set of customers.

26. The non-transitory computer readable medium of claim 19, comprising computer-executable instructions that, when executed by the processor, cause the processor to:
   determine zone factors associated with a plurality of zones, wherein a subset of the set of customers is associated with a respective one of the plurality of zones, wherein each of the zone factors is based on the inconvenience factors associated with a respective subset of the set of customers; and
   determine a subset of the plurality of zones to isolate in order to restore power to the zones, wherein the subset of the plurality of zones is determined based on the zone factors.

27. The non-transitory computer readable medium of claim 26, wherein each of the zone factors is a sum of inconvenience factors associated with the subset of the set of customers associated with the respective one of the plurality of zones.

28. The non-transitory computer readable medium of claim 27, wherein each of the inconvenience factors is determined based on scaling the one of the plurality of effective interruption times associated with one of the set of customers with the one of the priority factors associated with the one of the set of customers.

29. The non-transitory computer readable medium of claim 26, comprising computer-executable instructions that, when executed by the processor, cause the processor to: determine an amount of load to be reduced to restore power to the zones and determine a load demand associated with each of the plurality of zones.

30. The non-transitory computer readable medium of claim 29, wherein the subset of the plurality of zones to isolate is determined based on the amount of load to be reduced to restore power to the zones and the load demand associated with each of the plurality of zones.

31. The non-transitory computer readable medium of claim 26, wherein each of the plurality of effective interruption times is further based on a willingness factor, wherein each willingness factor represents how willing a respective one of the set of customers is to use a back-up device.

32. The non-transitory computer readable medium of claim 31, wherein each of the willingness factors scales the back-up time associated with a respective one of the set of customers.

33. The non-transitory computer readable medium of claim 26, wherein each of the plurality of effective interruption times is based on a difference between:
   the outage time; and
   the back-up time associated with a respective one of the set of customers.

34. The non-transitory computer readable medium of claim 26, wherein at least one of the plurality of zones is served by a feeder line.

35. The non-transitory computer readable medium of claim 26, wherein at least one of the plurality of zones is defined by a set of customers located between two switches in a network.

36. The non-transitory computer readable medium of claim 19, wherein determining the subset of the set of customers to isolate in order to restore power to the set of customers includes determining a subset of a plurality of zones to isolate in order to restore power to the zones.

* * * * *